(12) United States Patent
Waybright

(10) Patent No.: US 9,485,958 B2
(45) Date of Patent: Nov. 8, 2016

(54) FACILITY FOR HANDLING LACTATING ANIMALS AND METHOD OF OPERATING SAME

(71) Applicant: Bert J. Waybright, Gettysburg, PA (US)

(72) Inventor: Bert J. Waybright, Gettysburg, PA (US)

(73) Assignee: Bert J. Waybright, Gettysburg, PA (US)

( * ) Notice: Subject to any disclaimer, the term of this patent is extended or adjusted under 35 U.S.C. 154(b) by 129 days.

(21) Appl. No.: 14/584,197

(22) Filed: Dec. 29, 2014

(65) Prior Publication Data

US 2016/0183493 A1    Jun. 30, 2016

(51) Int. Cl.
*A01J 5/00* (2006.01)
*A01K 1/12* (2006.01)

(52) U.S. Cl.
CPC ........................ *A01K 1/12* (2013.01)

(58) Field of Classification Search
CPC ........................................ A01K 1/12
USPC ........................... 119/14.02, 14.03
See application file for complete search history.

(56) References Cited

U.S. PATENT DOCUMENTS

| | | | | |
|---|---|---|---|---|
| 1,968,564 A | * | 7/1934 | Luks | A01J 1/00 119/14.04 |
| 2,039,562 A | * | 5/1936 | Shodron | A01K 1/00 119/14.03 |
| 2,305,259 A | * | 12/1942 | Jeffers, Sr | A01K 1/126 119/14.04 |
| 3,246,631 A | * | 4/1966 | Holm | A01J 5/017 119/14.03 |
| 4,715,322 A | | 12/1987 | Johansson | |
| 5,959,526 A | * | 9/1999 | Tucker | A01J 5/0175 119/14.03 |
| 6,394,027 B2 | * | 5/2002 | Gallagher | A01K 1/12 119/14.03 |
| 6,814,026 B2 | * | 11/2004 | Guo | A01K 1/12 119/14.02 |
| 7,810,450 B2 | | 10/2010 | Sensenig | |
| 8,402,919 B2 | | 3/2013 | Johansson et al. | |
| 9,179,639 B2 | * | 11/2015 | Van De Walle | A01K 1/12 |
| 2008/0257267 A1 | | 10/2008 | Osthues et al. | |
| 2013/0167775 A1 | * | 7/2013 | Van De Walle | A01K 1/12 119/14.02 |

FOREIGN PATENT DOCUMENTS

| | | |
|---|---|---|
| DE | 102007045997 A1 | 4/2009 |
| EP | 2042034 A2 | 4/2009 |

* cited by examiner

*Primary Examiner* — Kristen C Hayes
(74) *Attorney, Agent, or Firm* — Hauptman Ham, LLP

(57) ABSTRACT

Facility for lactating animals includes pens in a freestall barn and a milking parlor where animals from the pens are simultaneously milked while separated. The number of animals from different pens in milking stalls is changed by sliding a parlor barrier past entrances and exits of parlor stalls. Each pen includes bedding free stalls, an alley accessible by the animals as they enter and leave the free stalls, and a movable barrier traversing the accessible alley. The pen barrier assures that animals go to the milking parlor. Paths cause animals in a first pen, prior to milking, to return to the first pen after milking while preventing animals in other pens, prior to milking, from entering the first pen after milking. There are separate return alleys to each pen from separate parlor exits. The pen barrier prevents animals from occupying stalls it passes and refurbishes these stalls.

37 Claims, 7 Drawing Sheets

FACILITY FOR HANDLING LACTATING ANIMALS AND METHOD OF OPERATING SAME

FIELD OF INVENTION

The present invention relates generally to facilities for handling lactating animals and methods of operating same, and more particularly to such a facility that includes pens in a freestall barn in combination with a milking parlor in which animals from the pens can be simultaneously milked while being maintained separated from each other and the number of animals from the different pens in milking stalls of the parlor can be changed by sliding a barrier arrangement of the parlor past entrances and exits of the milking stalls, and to a method of operating same.

Another aspect relates to a facility that includes pens in a freestall barn in combination with a milking parlor, wherein each pen includes (a) a set of bedding free stalls, (b) an alley accessible by the animals as they enter and leave the free stalls and (c) a movable barrier for traversing the accessible alley of its respective pen, which barrier assures that the animals go to the milking parlor, and the facility includes paths for (a) causing animals assigned to and located in a first pen, prior to milking, to return to the first pen after being milked while preventing animals assigned to and located in other pens, prior to milking, to enter the first pen after being milked, and (b) enabling animals assigned to the different pens to be simultaneously milked in different milking stalls of the parlor, and the paths include separate return alleys to each pen from separate exits of the parlor for the animals assigned to each pen, and to a method of operating same.

A further aspect relates to a facility having a milking parlor and a freestall barn including a pen having (a) a set of bedding free stalls, (b) an alley accessible by the animals as they enter and leave the free stalls and (c) a movable barrier for traversing the accessible alley, which barrier assures that the animals go to the milking parlor and includes bedding refurbishing devices for stalls being passed by the barrier and which do not have animals in them due to the barrier moving by them, and to a method of operating same.

An additional aspect relates to a facility for handling lactating animals in two or more pens including a parlor configuration that preserves the integrity of animal groups in different pens and does not necessarily have a movable barrier or movable obstruction in the parlor, but wherein the parlor includes (1) a row of milking stalls, (2) first and second barriers that extend parallel to the row to form first and second corridors for animals going to and from the milking stalls, and (3) a planar obstruction arrangement in the corridors, wherein the second barrier is shorter than the row by at least the width of two milking stalls and the animals are maintained, after milking, in the pens where they were prior to milking.

BACKGROUND ART

Modern facilities for handling lactating animals, particularly cows, usually include a free stall barn in combination with a milking parlor. The free stall barn includes many bedding stalls, separated by dividers. Each bedding stall preferably includes deep bedding material because it is the most comfortable surface for a lactating animal, particularly a cow, to lie on. Clean, comfortable bedding material usually results in a healthy and productive milked animal. To maintain the bedding material clean and comfortable, the bedding material must be well-maintained, which typically requires a considerable amount of labor. The labor, which is performed after the animals have been taken to the milking parlor, includes hand cleaning and grooming with a rake or the use of power tools. A reliable source of good bedding material must also be frequently added, usually manually. These chores are performed by a person who is also responsible for herding the animals from the bedding stalls to milking stalls in the milking parlor; such a person is frequently referred to as a cow chaser.

In traditional milking facilities, the cow chaser urges a group of cows from bedding stalls in a pen, to which the cows in the group are assigned, to the milking parlor. The cows assigned to a particular group have similar characteristics, such as recently given birth to a calf or high fat content milk. Traditional, non-robotic, parlors are designed to simultaneously milk cows of one group at a time, followed by the simultaneous milking of cows of a second group, and so on until all cows to be milked have been processed. The cow chaser sequentially goes to each pen in the barn to sequentially fetch each group of cows from the different pens to the parlor. After milking, the cow chaser returns the cows of each group to the pen in the barn to which the cows in the group are assigned. To perform these chores, the cow chaser must open and close many gates in the barn and parlor for each group of animals. While the cows of each group are being milked, the cow chaser is expected to clean and refurbish the bedding stalls of the pen to which the cows in the group being milked are assigned. Refurbishing usually involves removing some bedding material, adding new bedding material and fluffing the bedding material.

The requirement for group movement causes inefficiency because the cow chaser's manual operations often are erroneous particularly during movement of the animals; a common error is failure to open and close the gates correctly. Another disadvantage of group movement is that animals are moved in a queue, which often causes cow slipping and falling. In addition, the cows are frequently stressed by waiting a long time in a queue to reach the milking stalls. All of these adverse experiences reduce milk productivity.

After milking, the cows in a group are encouraged to eat, drink, lie down and chew their cuds at a feed bunk located between the parlor and the bedding stalls The feed bunk must include, for each cow in the group, a free stall having sufficient room for these activities as well as for water bowls. The feed bunks inefficiently use space in the barn.

At some time, any individual cow must be sorted (i.e., removed) from its assigned group for various activities, such as treatment or breeding. The sorted animals go through selectively opened and closed gates into a sort pen after leaving the parlor. After the activity has been performed in the sort pen, the animal goes through another set of selectively opened and closed gates to bedding stalls of its assigned group. The cow chaser performs these gate opening and closing operations, sometimes in an erroneous manner which contributes to inefficient operation.

Modern milking facilities avoid many of these inefficiencies by relying on the fact that most lactating animals, particularly cows, go from their free stall bedding stalls to milking stalls of milking parlors on a regular, frequently periodic, basis because of their own desire to be milked. However, a small percentage of lactating animals, particularly cows, do not go to the milking parlor in a timely manner. The animals that do not go to the milking parlor of their own volition must be urged to do so by a cow chaser, resulting in some of the inefficiencies of the traditional milking facilities.

Johansson et al., U.S. Pat. No. 8,402,919 attempts to resolve the problems associated with cows not going to the milking parlor of their own volition by using a computer controlled movable partition in each of plural resting areas of a milking facility including a milking area and a space consuming feeding area. The partition in each resting area periodically traverses an alley of its associated resting area to periodically drive the cows from the resting area to the milking area. In the embodiment of FIG. 1, a complex gate arrangement guides the cows from the space consuming feeding area to the resting area. The cows in the resting area are free to go to any of several milking stalls so there is no attempt to separate the milk from different groups of cows. In the embodiment of FIG. 2, the cows in the resting area are not separated into groups, but are directed to different milking areas by a complex gate arrangement. In the FIG. 3 embodiment, the cows in different resting areas are confined to certain milking stalls by a complex gate arrangement, which can be changed depending on the relative number of cows ready to be milked in each resting area. After the cows have been milked, they return to the same resting area that they originally left, after eating at a feed table in the feed area. The cows' return to the resting areas is impeded by cows leaving the rest area to go to the milking stalls.

SUMMARY

An aspect of the disclosure relates to a facility for handling lactating animals comprising a free stall barn having first and second pens, each including: a set of bedding free stalls, and an alley accessible by the animals as they enter and leave the free stalls. The facility also includes a milking parlor including plural milking stalls, each including an entrance and an exit. Paths for the animals are arranged for (a) causing animals assigned to and located in the first pen, prior to milking, to return to the first pen after being milked, (b) causing animals assigned to and located in the second pen, prior to milking, to return to the second pen after being milked, and (c) enabling animals assigned to the first and second pens to be simultaneously milked in different milking stalls of the parlor. The paths include: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen; the first return alley and a barrier arrangement of the milking parlor being arranged so that the animals assigned to the second pen cannot enter the first return alley, and (d) a second return alley extending from the second exit in the parlor to a portion of the accessible alley of the second pen. The first and second return alleys and a barrier arrangement of the milking parlor are arranged so that the animals assigned to the second pen cannot enter the first return alley and the animals assigned to the first pen cannot enter the second return alley. The barrier arrangement of the parlor is arranged for causing animals entering the parlor via the first parlor entrance to be guided only to the entrances of milking stalls having exits that are accessible to the first return alley, and animals entering the parlor via the second parlor entrance to be guided only to the entrances of milking stalls having exits that are accessible to the second return alley. The barrier arrangement of the parlor includes a movable segment having a slidable obstruction arrangement that is slidable past the entrances and exits of the milking stalls so that during different times the slidable obstruction arrangement position can cause the animals from the first and second pens to enter and leave differing numbers of the milking stalls. Such a facility is particularly advantageous because after initial setup, that is, after cleaning of the parlor, no changes, such as opening and closing of gates are necessary, except movement of the parlor slidable obstruction, which is performed only when the number of animals in one pen desiring access to the parlor considerably exceeds the number of such animals in the other pen, and opening and closing of gates at the exits of the milking stalls, as occurs automatically when milkers are released from teats of the animal, or if an animal has a change in status requiring access to a sort pen.

Preferably, the slidable obstruction arrangement enables the number of milking stalls available to animals assigned to the first and second pens to be easily changed by a human or mechanical operator.

Another aspect of the disclosure relates to a facility for handling lactating animals comprising a free stall barn having first and second pens, each including: (a) a set of bedding free stalls, (b) an alley accessible by the animals as they enter and leave the free stalls and (c) a movable barrier for traversing the accessible alley of its respective pen. A milking parlor includes plural milking stalls each having an entrance and an exit. Paths in the facility (a) cause animals assigned to and located in the first pen, prior to milking, to return to the first pen after being milked while preventing the animals assigned to and located in the second pen, prior to milking, to enter the first pen after being milked, (b) cause animals assigned to and located in the second pen, prior to milking, to return to the second pen after being milked while preventing the animals assigned to and located in the first pen, prior to milking, to enter the second pen after being milked, and (c) enable animals assigned to the first and second pens to be simultaneously milked in different milking stalls of the parlor. The paths include: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen, which portion of the accessible alley of the first pen is behind the movable barrier of the accessible alley of the first pen, and (d) a second return alley extending from the second exit in the parlor to a portion of the accessible alley of the second pen, which portion of the accessible alley of the second pen, is behind the movable barrier of the accessible alley of the second pen. The first and second return alleys and a barrier arrangement of the milking parlor are arranged so that animals assigned to the second pen cannot enter the first return alley and animals assigned to the first pen cannot enter the second return alley. The first return alley, the accessible alley of the first pen and the movable barrier of the first pen are arranged so the animals assigned to the first pen are, prior to milking, in front of the movable barrier of the first pen and after milking are behind the movable barrier of the first pen. The second return alley and the barrier arrangement of the milking parlor are arranged so the animals assigned to the first pen cannot enter the second return alley. The second return alley, the accessible alley of the second pen and the movable barrier of the second pen are arranged so animals assigned to the second pen are, prior to milking, in front of the movable barrier of the second pen and after milking are behind the movable barrier of the second pen;. The barrier arrangement of the parlor causes animals entering the parlor via the first parlor entrance to be guided only to the entrances of milking stalls having exits that are accessible to the first return alley, and causes animals entering the parlor via the second parlor entrance to be guided only to the entrances of milking stalls having exits that are accessible to the second return alley. Such a facility is particularly advantageous because after initial setup, that is, after cleaning of the parlor, no changes, such as opening and closing of gates are necessary, except opening and closing of gates at the exits of the milking stalls, as occurs automatically when milkers are released from teats of the animal and when an animal has a change in status requiring access to a sort pen.

An additional aspect of the disclosure relates to a facility for handling lactating animals, wherein the facility comprises a free stall barn having a pen including: (a) a set of bedding free stalls, and (b) an alley accessible by the animals as the animals enter and leave the free stall. The alley includes a barrier that is movable longitudinally in the alley past the stalls. Paths in the facility enable animals leaving the alley to go to the parlor and from the parlor back to a portion of the alley that is behind the barrier. The paths are such that animals located in the alley and stalls in front of the barrier, prior to milking, return, after milking, to a portion of the alley behind the barrier. The barrier, alley, stalls and paths: (a) cause animals in stalls and the alley segment in front of the barrier to move toward the milking parlor, and prevent animals in stalls and the alley segment behind the barrier from going in front of the barrier; and (b) prevent the animals to be in stalls that are next to the moving barrier. The barrier includes bedding refurbishing devices for refurbishing bedding in the stalls next to the barrier as the barrier traverses the alley.

An additional feature relates to facility for handling lactating animals including a parlor configuration that preserves the integrity of animals in different pens and does not necessarily have a movable barrier or movable obstruction in the parlor. In particular, such a facility comprises a free stall barn having first and second pens, each including: (a) a set of bedding free stalls, and (b) an alley accessible by the animals as they enter and leave the free stalls. A milking parlor includes plural milking stalls each including an entrance and an exit. Paths in the facility for the animals are arranged for (a) causing animals assigned to and located in the first pen, prior to milking, to return to the first pen after being milked, (b) causing animals assigned to and located in the second pen, prior to milking, to return to the second pen after being milked, and (c) enabling animals assigned to the first and second pens to be simultaneously milked in different milking stalls of the parlor. The paths include: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen; the first return alley and a barrier arrangement of the milking parlor arranged so that the animals assigned to the second pen cannot enter the first return alley, (d) a second return alley extending from the second exit in the parlor to a portion of the accessible alley of the second pen. The second return alley and the barrier arrangement of the milking parlor are arranged so that the animals assigned to the first pen cannot enter the second return alley. The barrier arrangement of the parlor is arranged for causing (i) animals entering the parlor via the first parlor entrance to be guided only to the entrances of milking stalls having exits that are accessible to the first return alley, and (ii) animals entering the parlor via the second parlor entrance to be guided only to the entrances of milking stalls having exits that are accessible to the second return alley. The barrier arrangement of the parlor includes an obstruction arrangement. The milking stalls are in a straight row. The barrier arrangement of the parlor includes: (a) a first fixed straight barrier that is parallel to the row to form a first corridor for animals going to the entrances of the milking stalls, (b) a second fixed straight barrier that is parallel to the row to form a second corridor for animals leaving the exits of the milking stalls. The obstruction arrangement: (a) is substantially planar, (b) extends at right angles to the corridors and the row, (c) and includes structures in the corridors for preventing animals in the corridors from moving between the sides of the barrier arrangement. The length of the second fixed barrier is less than the length of the row by a distance equal to the widths of at least two of the milking stalls. The paths are arranged so that (a) the animals in the second corridor and on a first side of the obstruction arrangement can reach the first return alley only by going from the second corridor to the first return alley around a first end of the second fixed barrier, and (b) the animals in the second corridor and on a second side of the obstruction arrangement can reach the second return alley only by going from the second corridor to the second return alley around a second end of the second fixed barrier.

A further feature is that the facility can include sort pens, one of which is provided for each pen. A gate arrangement is included between the return alley and sort pen associated with each pen. Because animals are infrequently assigned to the sort pens, operation of the sort pen gates has little effect on facility efficiency.

It is to be understood that reference to first and second structures, such as pens, does not preclude inclusion of additional similar structures, such as third and/or fourth pens. In addition, while the detailed description of the drawing refers to cows, it is to be understood that the description is applicable to any type of lactating animals, such as goats.

Additional aspects and advantages of the present invention are set forth in part in the description which follows, and in part are obvious from the description, or may be learned by practice of the present invention. The aspects and advantages of the present invention can also be realized and attained by the instrumentalities and combinations particularly pointed out in the appended claims. The particular embodiment of the present invention as hereinafter described in conjunction with the appended drawings, wherein like designations denote like elements, is provided to illustrate and not to limit the present invention.

DETAILED DESCRIPTION OF THE DRAWING

Figure 1:
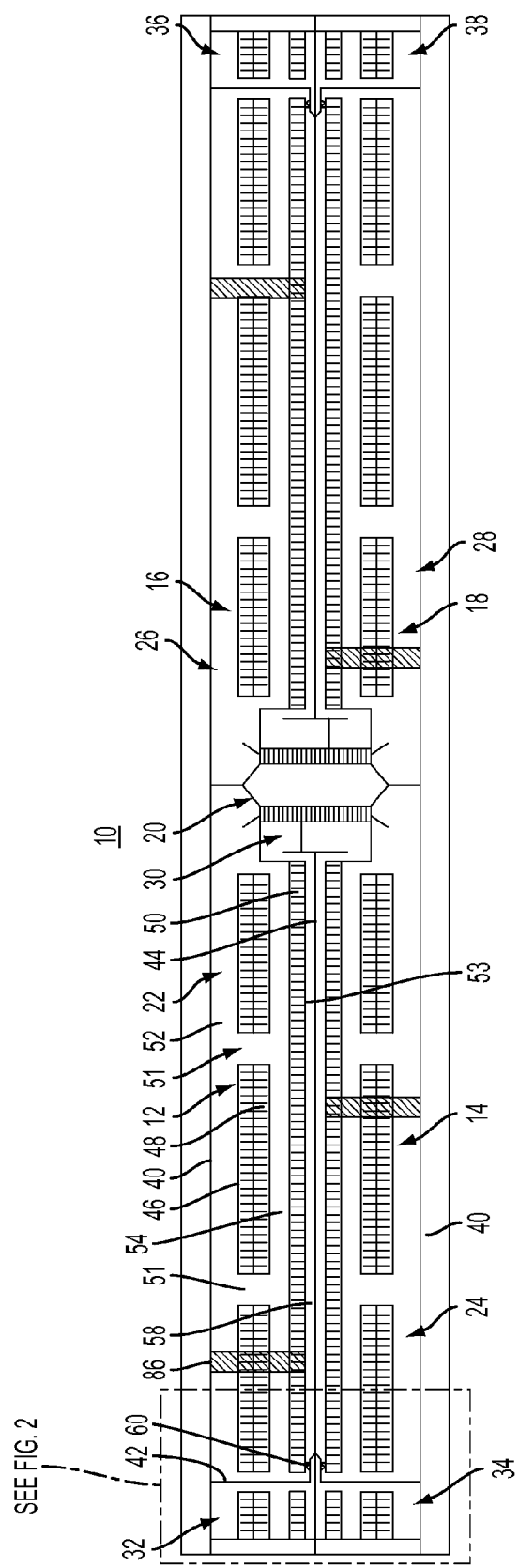
FIG. 1 is a plan view of a preferred embodiment of a facility for handling lactating cows, which facility includes a free stall barn having four pens and a central milking parlor.
Figure 4:
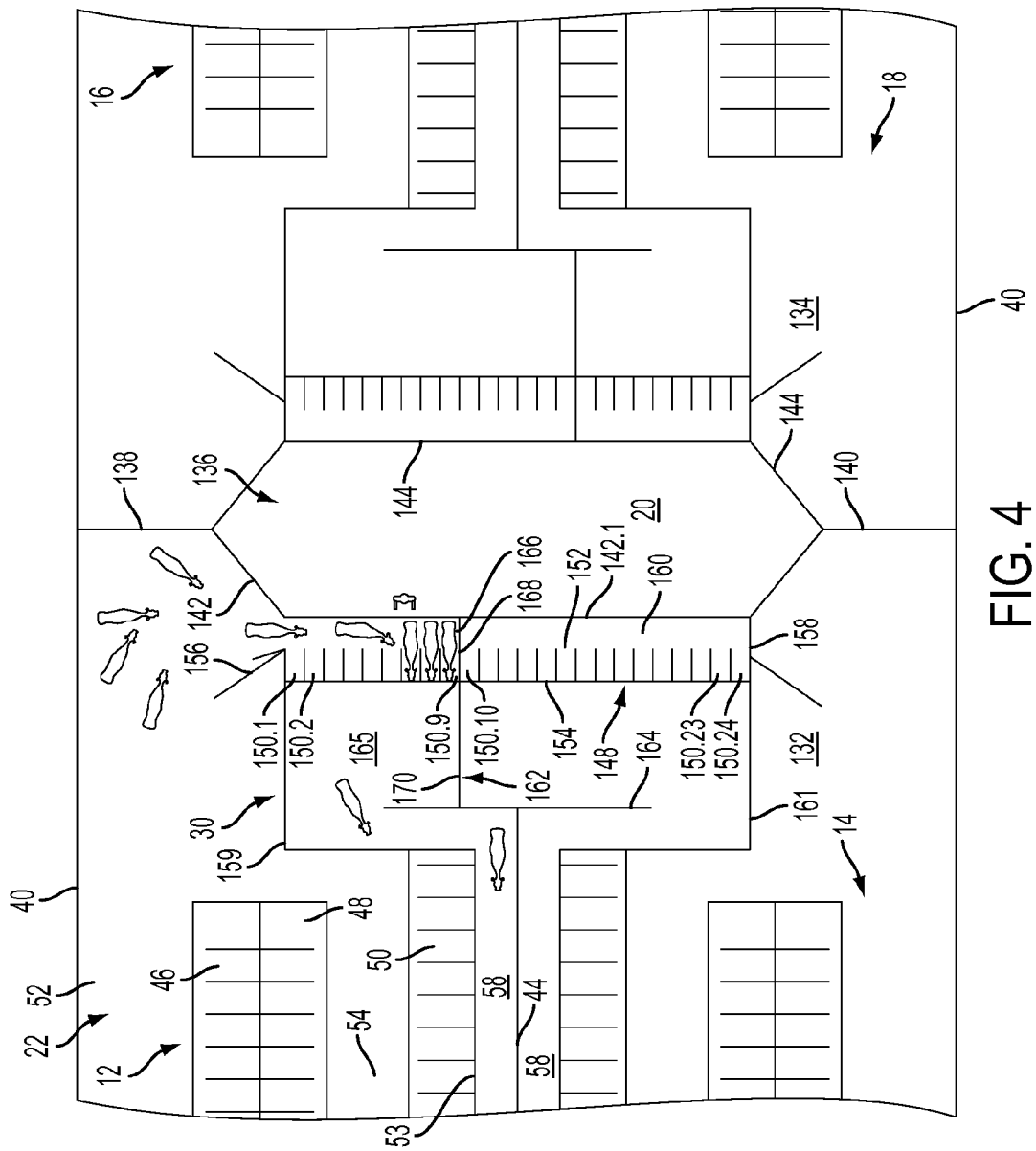
FIG. 4 is a detailed plan view of the center of a facility as illustrated in FIG. 1, wherein milkers in a milking parlor are manually attached to cows.
Figure 6:
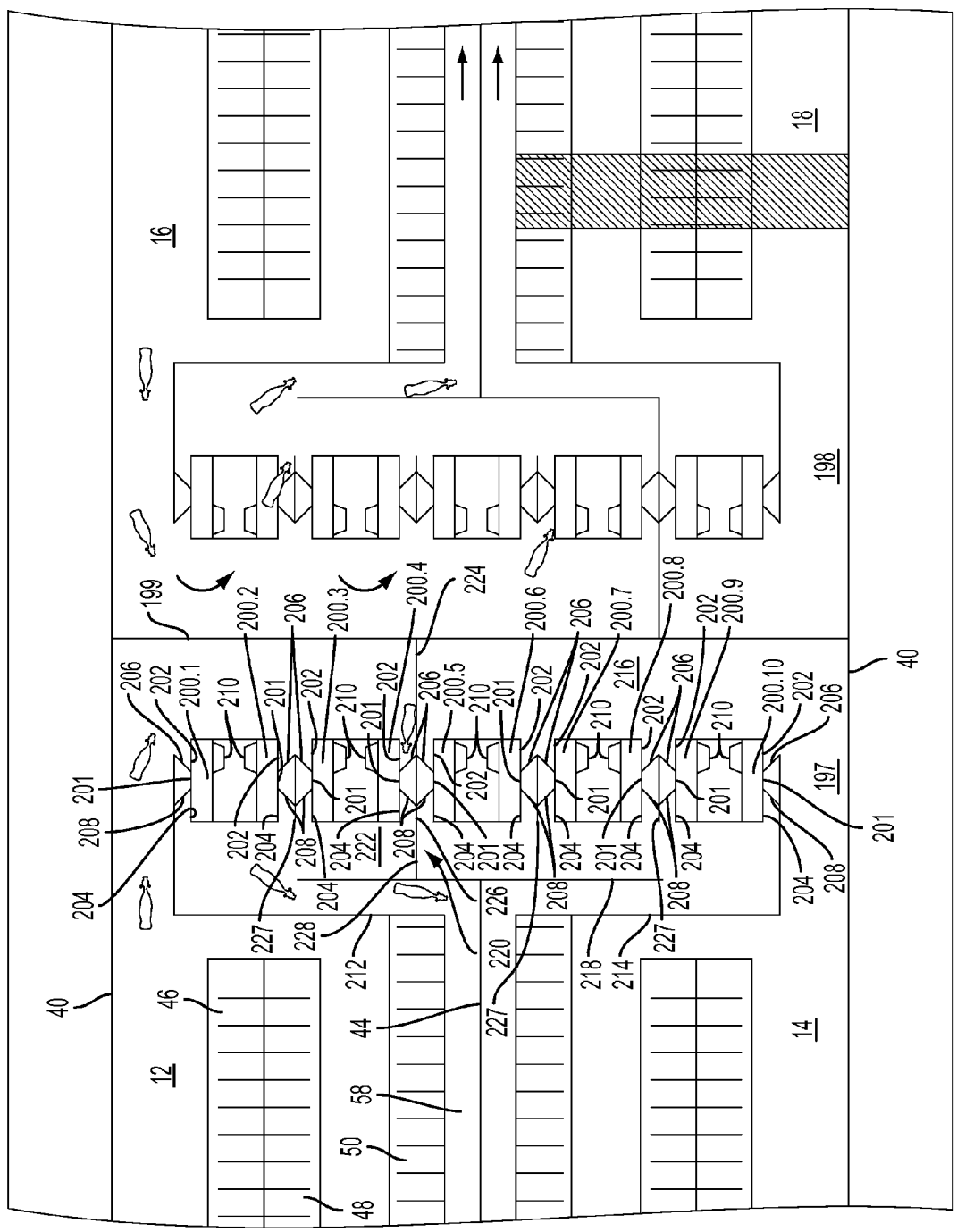
FIG. 6 is a detailed plan view of the center of a facility as illustrated in FIG. 1, wherein milkers in a milking parlor are robotically attached to cows.

Referring to FIG. 1, facility 10 for handling lactating cows includes a free stall barn containing pens 12, 14, 16 and 18, as well as centrally located milking parlor 20, which can be equipped to manually or robotically apply milkers to teats of the cows, as respectively illustrated in FIGS. 4 and 6. The cows assigned to different pens 12, 14, 16 and 18 usually have differing characteristics, such as time from the most recent calf delivery. Paths 22, 24, 26 and 28, respectively associated with pens 12, 14, 16 and 18, are connected to parlor 20 where the cows from pens 12, 14, 16 and 18 can be simultaneously milked. Paths 22, 24, 26 and 28, as well as a cow movement confining barrier arrangement 30 in parlor 20, are arranged so that cows assigned to and located in a particular pen prior to milking return to the same pen after milking, unless a particular cow is to be diverted to one of sort pens 32, 34, 36 and 38, respectively associated with and located at the ends of pens 12, 14, 16 and 18 remote from parlor 20. Generally the cows go on their own volition from pens 12, 14, 16 and 18 to parlor 20.

Since pens 12, 14, 16 and 18 are the same and pens 32, 34 36 and 38 are the same, except as noted herein, the description of pen 12 is applicable to pens 14, 16 and 18 and the description of pen 32 is applicable to pens 34, 36 and 38.

Fences 40, 42 and 44 at the periphery of pen 12, as well as cow movement confining barrier arrangement 30 in parlor 20, confine the cows assigned to pen 12 in pen 12 and prevent cows from the other pens from getting into pen 12. Fences 42 and 44 are respectively shared with neighboring pens 32 and 14, to define the peripheries of the neighboring pens.

Pen 12 has three rows 46, 48 and 50 of free stalls containing bedding. Adjacent pairs of the free stalls are separated from each other by conventional rail dividers. Rows 46, 48 and 50 run the length of pen 12, except at openings 51 which provide roaming room for the cows in pen 12. Rows 46 and 48 are back to back, while row 50 is a standalone row. The cows in row 46 have access to alley 52, and the cows in rows 48 and 50 have access to alley 54. Alleys 52 and 54 run the length of pen 12 and are parts of path 22, which parts enable the cows that are ready to be milked in the stalls of rows 46, 48 and 50 to go to parlor 20; as such alleys 52 and 54 are sometimes referred to as access alleys in this document. Pen 12 also includes water bowls and feed bunks (neither of which is shown)

Path 22 also includes return alley 58 that is not accessible to the cows in the stalls of rows 46, 48 and 50 due to fence 53, which runs along the side of row 50 opposite from alley 54. Alley 58 also includes one way gate 60 that enables cows from return alley 58 to go into pen 12 but prevents the cows in pen 12 from entering the return alley. Return alley 58 extends through the length of pen 12, from parlor 20 almost to the end of pen 12 next to sort pen 32, so that the cows after being milked in parlor 20 return to the end of one of alleys 52 or 54 next to pen 32, thence to a stall in one of rows 46, 48 or 50. Return alley 58, which is not wide enough for two cows, provides an orderly one way flow of cows from parlor 20 back to pen 12, resulting in enhanced efficiency of facility 10. Return alleys 58 of pens 12 and 14 are separated from each other by straight fence 44 which prevents the cows retuning to pen 12 in alley 58 of pen 12 from getting into alley 58 of pen 14, and vice versa.

The vast majority of cows traversing return alley 58 go back to pen 12 via sort gate 60 that normally allows the flow of cows from alley 58 to the interior of pen 12, as described above. Occasionally a cow requires special attention and must be separated from the other cows in the group of cows assigned to pen 12. Such a cow (referred to as a sort cow) is diverted to sort pen 32 by changing sort gate 60 so there can be no cow flow between return alley 58 and the interior of pen 12 and there can be only one way cow flow from return alley 58 to the interior of pen 32.

Figure 2:
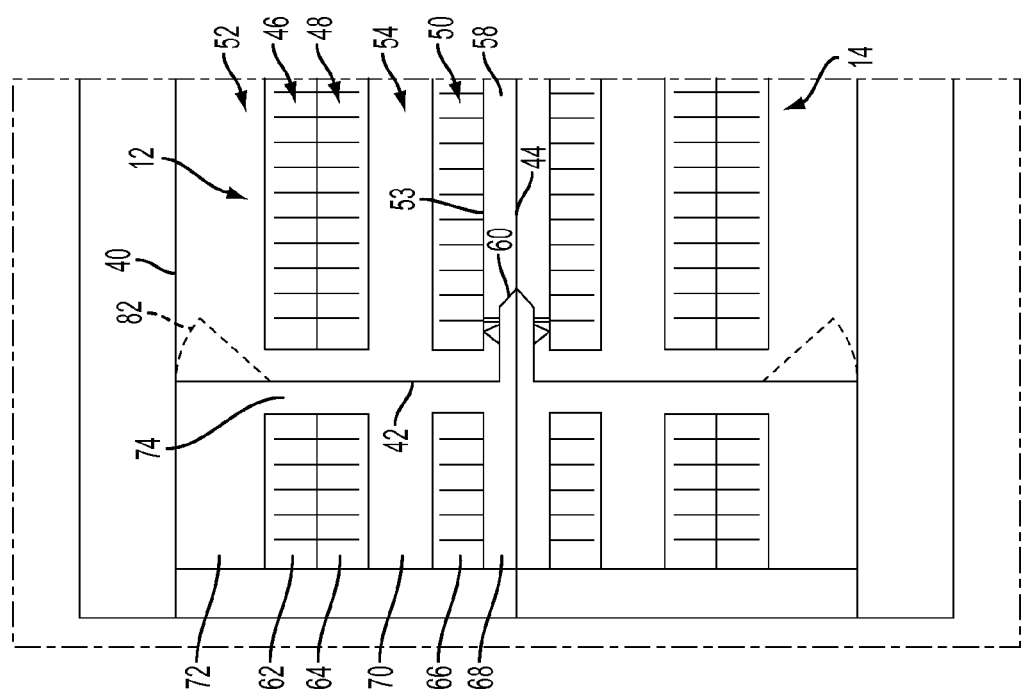
FIG. 2 is a detailed plan view of one end of the facility of FIG. 1, at which end a sort pen is located.

As illustrated in FIG. 2, sort pen 32 includes three short rows 62, 64 and 66 of bedding stalls and alleys 68, 70, 72 and 74, all surrounded by confining fences 42, 76, 78 and 80. Pen 32 also includes a water bowl and feed bunk (neither shown). Consequentially, sort pen 32 is not materially different from pen 12, so cows confined to pen 32 are in essentially the same situation as in pen 12, resulting in low stress and a quick return to full productivity after being returned to pen 12 for milking. Fence 42, between pens 12 and 32, includes normally closed one way gate 82, which is opened after a procedure has been completed on the sort cow, to enable the sort cow to return to pen 12. Switching the states of gates 60 and 82 does not materially affect the efficiency of facility 10 because such actions do not occur frequently and are often performed by personnel who administer to the sort cow, rather than personnel who normally operate the facility, such as a cow chaser.

Most of the cows in pen 12 go from the bedding stalls of rows 46, 48 and 50 to parlor 20 on their own volition about once every eight hours. However, there are some cows (lazy cows) that do not leave pen 12 to go to parlor 20 on their own volition. The lazy cows must be urged to go to parlor 20 from pen 12. To this end, pen 12 includes barrier 86 that extends across the pen from fence 40 to fence 53 that runs along the length of row 50 next to return alley 58. Barrier 86 has a length in the longitudinal direction of alley 54 that is greater than the width of the stalls in rows 46, 48 and 50; in the embodiment of FIG. 1 the length of barrier 86 is slightly greater than the width of two stalls in rows 46, 48 and 50. Barrier 86 urges the lazy cows toward parlor 20 by periodically (two or three times a day) slowly traversing the length of pen 12, from the ends of rows 46, 48 and 50 close to sort pen 32 to the ends of these rows close to parlor 20.

Figure 3:
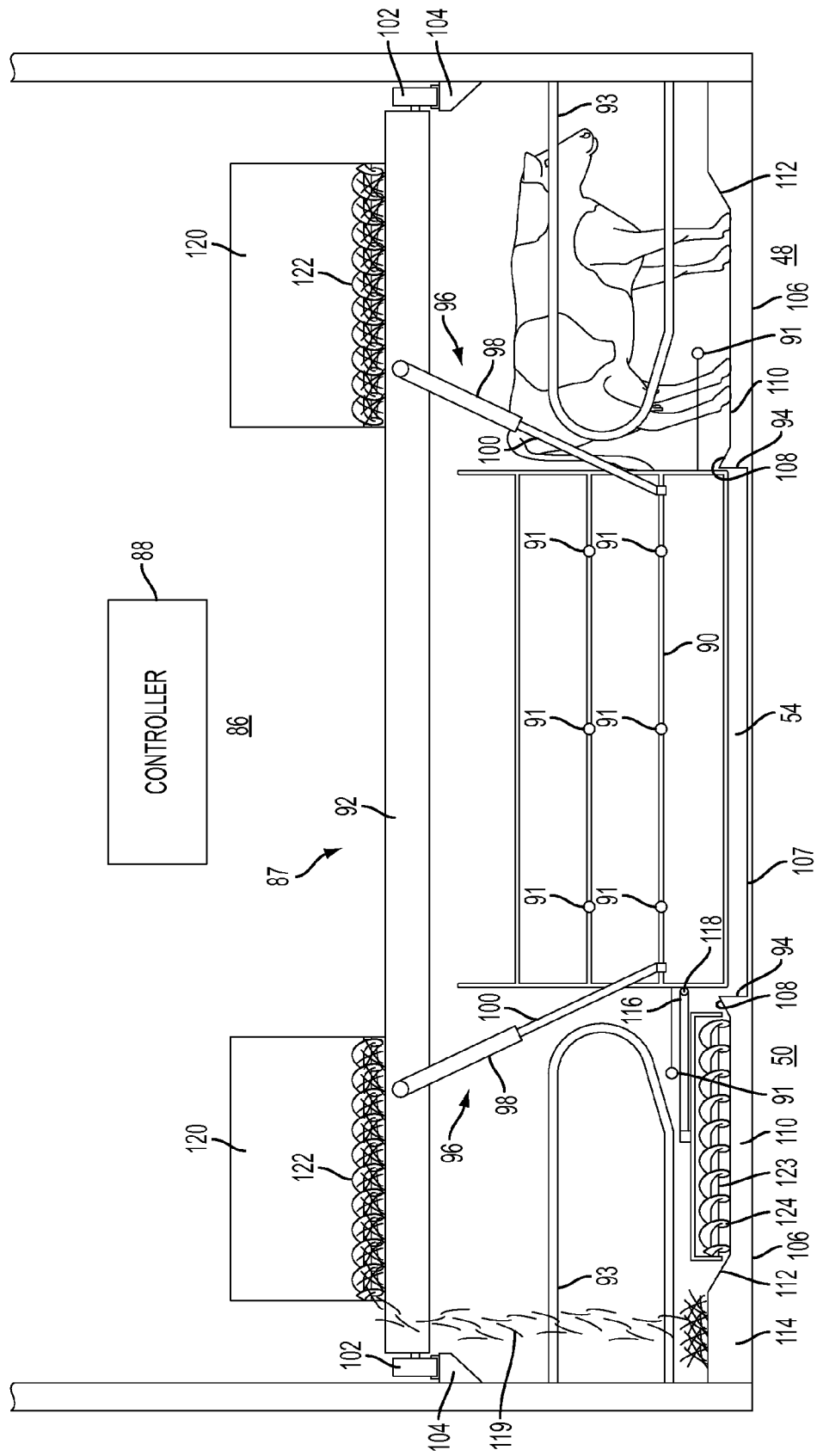
FIG. 3 is a front view of a barrier that traverses alleys in the pens of FIG. 1, in combination with one of the alleys and bedding stalls in two stall rows next to the alley, wherein the barrier includes structures for maintaining bedding in the bedding stalls of the pens.

FIG. 3 is a front view of portion 87 of barrier 86, which portion extends across rows 48 and 50, as well as alley 54; the portion of barrier 86 that extends across row 46 and alley 52 is not illustrated because it is substantially the same as barrier portion 87. Barrier portion 87 is mechanically connected to the barrier portion extending over row 46 and alley 52 so the two barrier portions traverse the lengths of alleys 52 and 54 together.

Controller 88 responds to sensors on barrier 86 and transmits signals to various devices on barrier 86 to control (1) barrier movement, (2) cleaning of bedding material, (3) dispensing of new bedding material, (4) grooming of bedding material, and (5) lifting and lowering of fence 90 that is carried by frame 92. Frame 92 is mounted above rows 48 and 50, as well as alley 54, being spaced from the floors of rows 48 and 50 sufficiently to provide head room for cows standing in rows 48 and 50, as well as alley 54. The length of fence 90 in the direction of the width of alley 54 is slightly less than the width of alley 54. While fence 90 is in the raised position, the bottom of the fence is vertically aligned with the bottom of frame 92 so the fence does not interfere with the movement of cows in alley 54.

While fence 90 is in the low position, the bottom of the fence is between curbs 94 of rows 48 and 50 so the cows in alley 54 and rows 48 and 50 cannot go in front of the fence and are confined to a region behind barrier 86. Stall dividers 93 of rows 48 and 50 prevent movement around fence 90 of the cows that are in rows 48 and 50 and are behind barrier 86. If a cow is in alley 54 or the stalls of rows 48 or 50 while fence 90 moves toward parlor 20 and the fence is slightly behind the point in alley 54 where the cow is located or the fence is at a point in the alley slightly behind a cow in row 48 or 50, one or more of contact sensors 91 that sense the presence of the cow, causing controller 88 to stop movement of barrier 86. Accordingly, fence 90 carries one or more contact sensors 91 that extend slightly in front of the fence. Fence 90 carries two additional contact sensors 91 that extend outwardly and slightly forwardly of the fence over the floors of the stalls in rows 48 and 50 and under the lower rail of stall dividers 93.

Assemblies 96, including hydraulic cylinders 98 and cylinder shafts 100, respectively pivotally mounted on the front face of frame 92 and the ends of a lower rung of fence 90, raise and lower the fence in response to control signals that controller 88 supplies to actuators in the cylinders which retract and extend cylinder shafts 100.

Frame 92 carries motor driven wheels 102 which ride on tracks 104 above the edges of rows 48 and 50 that are remote from alley 54. A reversible motor (not shown) which drives wheels 102 is fixedly mounted on frame 92 and is responsive to signals from controller 88, causing the motor to drive wheels 102 and therefore frame 92 and therefore barrier 86 from one end of rows 46, 48 and 50 to the other end of rows 46, 48 and 50. In response to barrier 86 completing its traversal of rows 46, 48 and 50 so the barrier is in the vicinity of parlor 20, controller 88 responds to a sensor (not shown) at that end of one of tracks 104 to transmit signals to (1) the reversible drive motor for wheels 102, causing the barrier to return quickly to the vicinity of sort pen 32, and (2). an actuator of hydraulic cylinders 98, causing fence 90 to rise. Consequently, when barrier 86 is returning toward pen 32 it does not disturb the cows in rows 46, 48 or 50 or in alleys 52 and 54. In response to barrier 86 completing its traversal of rows 46, 48 and 50 so the barrier is in the vicinity of pen 32, controller 88 responds to a sensor (not shown) at that end of one of tracks 104 to transmit signals to (1) the reversible drive motor for wheels 102, causing the barrier to begin moving slowly toward parlor 20, and (2). the actuator of hydraulic cylinders 98, causing fence 90 to drop quickly toward the alley floor.

The portions of barrier 86 behind fences 90 and above alleys 46, 48 and 50 carry: (1) cleaning implements for extracting manure and urine laden bedding from the stalls of rows 46, 48 and 50, (2) a dispenser of new bedding material, such as sand, sawdust or dried manure, which is added to the bedding material remaining in the stalls in rows 46, 48 and 50 after these stalls have been cleaned, and (3) grooming devices which re-face the bedding material after new bedding material has been added. The cleaning, dispensing of new bedding material and grooming of the stalls in alleys 46, 48 and 50 are essential to the success of deep bedding. These operations are performed under the control of controller 88 while barrier 86 is moving slowly toward parlor 20; controller 88 stops these operations if and while barrier 86 stops.

While barrier 86 is moving toward parlor 20 the cows that have been milked and have returned to the stalls of rows 46, 48 and 50 and to alleys 52 and 54 during the present cycle of barrier movement are behind the barrier as a result of these cows going into the portion of pen 12 next to sort gate 60. While barrier 86 is moving toward parlor 20 the cows that have not been milked are in front of the barrier. Most of the cows in front of barrier 86 are staggered far from the barrier and therefore are not in a group. Consequently, the cows, during their movements in both directions between pen 12 and parlor 20, move on their individual schedule, without group movement, to provide contented and therefore more productive cows.

Because rows 46, 48 and 50 and the cleaning, dispensing, and grooming devices for these rows are essentially the same and for clarity, only the details of row 50 and the devices for refurbishing the bedding material of row 50 are illustrated and described. Row 50 includes concrete floor 106 that is slightly above floor 107 of alley 54. The edge of floor 106 next to alley 54 is defined by curb 94 including ramp 108 that extends slightly above depressed horizontal floor portion 110 where the legs of a cow in the stall are likely to be. Ramp 112 extends upwardly to horizontal platform 114 from the edge of floor portion 106 that is remote from curb 94.

As indicated by the right side of FIG. 3, the feet of a typical standing cow in a stall of row 48 or 50 are in floor depression 110 slightly inside ramps 108 and 112, the head of the cow faces away from alley 54, and the hindquarters of the cow are above the edge of floor portion 106 next to alley 54. Consequentially, excrement of the cow falls primarily on the bedding on the part of floor portion 106 that is close to curb 94 that has a tendency to confine the excrement. While a cow is illustrated in FIG. 3 it is to be understood that no cows are in stalls to barrier 86 while the barrier is next to such stalls because all cows in a particular row are either in front of or behind barrier 86, as described above. The illustration of a cow in FIG. 3 is only for explanatory purposes.

Excrement extractor 116, mounted on barrier 86 slightly above the top of ramp 108 and slightly behind fence 90, includes reciprocating arm 118 and a drive motor (not shown) for the arm. Arm 118 extends under the lowest rung of stall divider 93 and includes a fork (not shown) that is repeatedly driven back and forth by the reciprocating motor, in the direction between ramps 108 and 112 over the excrement carrying bedding, causing the fork to grab the excrement bearing bedding as barrier 86 slowly moves toward parlor 20. When the fork is retracted from row 50 in response to a signal from controller 88, while the fork is over alley 54, the controller transmits a signal to barrier 86, causing the fork to release the excrement carrying bedding into alley 54. The bedding in alley 54 is removed by an appropriate arrangement, such as a manure scrapper. When barrier 86 reaches the end of its travel close to parlor 20, controller 88 transmits a signal that stops the reciprocating motor driving extractor 116. When barrier 86 reaches the end of its travel, close to pen 32, controller 88 transmits a signal that starts the reciprocating motor.

After the excrement has been extracted from the bedding on floor depression 110, new bedding 119 is dropped on platform 114. Bedding box 120, mounted on the top of frame 92, carries the new bedding and includes auger 122 that transports the new bedding to a dispensing opening in the side of box 120 above platform 114 and behind extractor 116. Consequentially, new bedding 119 falls on platform 114 in a heap after the manure carrying bedding has been extracted. Much of the new bedding on platform 114 falls down ramp 112 to sit on the bedding remaining on floor depression 110. Rotary groomer 123 is carried by the lower portion of barrier 86 so the groomer is below the lowest rung of dividers 93. Groomer 123 has a length slightly less than the distance between ramps 108 and 112, and is located slightly above floor depression 110 at a position such that the longitudinal axis of the groomer is at a right angle to the travel direction of barrier 86 and is slightly behind the dispensing opening of box 120. Groomer 123 is driven by a rotary motor in response to control signals from controller 88 to cause teeth 124 of the groomer to fluff up the bedding material on floor depression 110.

The forward speed of barrier 86 in alleys 52 and 54, the length of barrier 86 in its direction of movement and the positions on the barrier of the stall refurbishing devices (the cleaning implements, bedding dispenser and grooming device) relative to fence 90 and to the stalls of rows 46, 48 and 50, and the widths of the stalls in rows 46, 48 and 50 are such that the stalls in rows 46, 48 and 50 next to these refurbishing devices have no cows in them as barrier 86 passes by them. All of the refurbishing activities in a particular stall are performed while no cow is in the stall because fence 90 and other structures of barrier 86 and stall dividers 93 prevent access by the cows to the stalls next to the barrier. The length of barrier 86 in its direction of forward movement, the forward speed of the barrier, the widths of the stalls in rows 46, 48 and 50 and the lengths of rows 46, 48 and 50 are such that there is adequate time for refurbishing each stall by the cleaning, dispensing and grooming devices. Because (1) there is no direct contact by the cows with the bedding refurbishing devices, and (2) of the slow movement of barrier 86 toward parlor 20, the cows in pen 12 are calm, clean and content The maximum forward movement speed of barrier 86 in alleys 52 and 54 is calculated based (1) on the amount of time required by the refurbishing devices to refurbish each bedding stall in rows 46, 48 and 50, (2) the length of the barrier in its direction of movement, and (3) the length of one of stall rows 46, 48 and 50 in the direction of barrier movement If the calculated maximum speed is such that barrier 86 would sweep through alleys 52 and 54 in less than the desired period (e. g., 12 hours for twice a day sweeping, eight hours for three times a day sweeping) the forward movement speed of barrier 86 is reduced accordingly. If the calculated maximum speed is such that barrier 86 would sweep through alleys 52 and 54 in more than the desired period, the desired period is adjusted or the lengths of stall rows 46, 48 and 50 are effectively shortened.

In operation, the vast majority of cows voluntarily go to parlor 20 without prompting by barrier 86. The vast majority of lazy cows also go toward parlor 20 as barrier 86 approaches them because of the noise made by the cleaning, dispensing and grooming of bedding in the stalls close to the lazy cows, as well as the visual effect of the approaching barrier. If a cow refuses to move toward parlor 20, one or more of sensors 91 detects the presence of such a recalcitrant cow and emits a signal that controller 88 detects to stop the drive motor for wheels 102. Controller 88 then causes activation of one or more annoying devices (not shown) on barrier 86, which devices are designed to urge the recalcitrant cow to move toward parlor 20; examples of such annoying devices are a beeper, buzzer, whistle, air blower, and flashing strobe light. Even if there are several recalcitrant cows that move toward parlor 20 during a cycle of barrier 86 only in response to activation of the annoying devices, a group of cows is not formed in front of barrier 86 because the recalcitrant cows start moving at different times and speed from different places, causing the recalcitrant cows to move independently toward parlor 20. If a recalcitrant cow still refuses to move, a person must fetch her. Thus barrier 86 encourages the lazy cows and most of the recalcitrant cows to go to parlor 20, but does not force them to the parlor.

Preferably, controller 88 causes the movement of the barriers in each of pens 12, 14, 16 and 18 to be staggered, that is the barriers of pens 12, 14, 16 and 18 approach parlor 20 at different times, to provide a more even flow into parlor 20 of cows to be milked from all four pens. For example, in a four pen facility in which the cycle repeats every eight hours, one of the barriers approaches parlor 20 about every two hours.

Referring now to FIG. 4, parlor 20 includes two segments 132 and 134; because segments 132 and 134 are substantially the same, only segment 132 is described, unless otherwise noted. Only cows from pens 12 and 14 are milked in segment 132 while only cows from pens 16 and 18 are milked in segment 134. The cows in segments 132 and 134 are separated from each other by fixed fences 138, 140 and 142. Fence 142 is located vertically above the edge of pit 136 that is occupied by a person who applies milkers to the teats of the cows to be milked. One end of each of fences 138 and 140 abuts opposite ends of fence 142. The other end of fence 138 abuts fixed fence 40 of pens 12 and 16 and the other end of fence 140 abuts fence 40 of pens 14 and 18. Thus fences 138, 140 and 142 can be considered to be (1) parts of the boundaries of pens 12, 14, 16 and 18 remote from sort pens 32, 34, 36 and 38 respectively associated with pens 12, 14, 16 and 18 and/or (2) fixed parts of cow movement confining barrier 30 of parlor 20.

Segment 132 of parlor 20 includes straight row 148 of milking stalls 150.1, 150.2 . . . 150.9, 150.10 . . . 150.23 and 150.24, each including milkers which a person in pit 136 applies to the teats of the cow occupying a particular milking stall. Each stall 150 includes an open entrance 152 and an exit that is selectively closed by gate 154 which the person closes prior to each cow entering a particular stall 150. Entrances 152 are aligned in a straight row so each is the same distance from the portion 142.1 of fence 142 that extends along an edge of pit 136 that is parallel to fences 138 and 140. Fence portion 142.1 and the entrances 152 of stalls 150 form opposite sides of straight elongated corridor 160 that is wide enough for only one cow. Stalls 150 have substantially the same length between their entrances and exits and parallel longitudinal axes that are at right angles to corridor 160. Upon completion of the milking process of a cow in a particular stall 150, the person or a mechanical actuator (not shown) automatically responsive to release of the milkers from the teats of the cow in the particular milking stall 150, opens gate 154 of the particular stall, enabling the milked cow to leave the milking stall and return to one of the bedding stalls of pen 12 or 14.

Only cows from pen 12 can enter corridor 160 at a point next to stall 150.1 and only cows from pen 14 can enter corridor 160 at a point next to stall 150.24 as a result of the placement of fences 138, 140, and 142, as well as the location of fixed fences 159 and 161 between the interior of parlor 20 and the ends of alleys 52 and 54 of pens 12 and 14, respectively. .The cows from pens 12 and 14 respectively enter corridor 160 via gates 156 and 158 at opposite ends of corridor 160, next to milking stalls 150.1 and 150.24; gates 156 and 158, when open, can be considered as first and second entrances to parlor 20.

The position of sliding barrier (i.e., obstruction) 162 along the length of corridor 160 determines the relative number of milking stalls 150 available to cows going through gates 156 and 158. Barrier 162 extends at right angles to corridor 160 from fence portion 142.1 almost to the side of fixed, straight fence 164 facing stalls 150. Barrier 162 is substantially planar and includes (1) segment 166 that blocks the passage of cows through corridor 160, (2) segment 168 that extends above stalls 150 sufficiently to clear the dividers between a pair of stalls 150 that are next to each other, and (3) segment 170 that blocks the passage of cows that exit stalls 150. Thus, segment 170 prevents the cows that exit stalls 150 from going from one side of barrier 162 to the other side of barrier 162. A person or controller 88 responds to the relative number of cows from pens 12 and 14 expected to be milked in the near future to determine the desired position of barrier 162 and then moves the barrier accordingly, unless such movement would .result in barrier 162 sliding over a cow in one of stalls 150.

Fixed fence 164 extends parallel to corridor 160 and at right angles to barrier 162. The side of fence 164 facing stalls 150 and the exits of stalls 150 form corridor 165 that is occupied by segment 170 of barrier 162. A gap between the end of sliding barrier 162 and fence 164 is so small that a cow cannot fit between barrier 162 and fence 164. The center of fence 164 is aligned with the center of row 148 and the side of fence 164 facing away from stalls 150 abuts the end of fixed straight fence 44 between return alleys 58 of pens 12 and 14.

The length of fence 164 is such that regardless of the position of barrier 162, within allowable limits, the cows from pen 12 that were milked in stalls between gate 156 and barrier 162 cannot enter return alley 58 of pen 14 and the cows from pen 14 that were milked in stalls between gate 158 and the barrier cannot enter return alley 58 of pen 12. In general the length of fence 164 is less than the length of row 148. The maximum length of fence 164 is the length of row 148 minus the width of two of stalls; in FIG. 4, the length fence 164 is the length of row 148 of stalls 150 minus the width of ten stalls 150. The travel of sliding barrier 162 is limited to certain stalls 150 in the center of corridor 160; in the embodiment of FIG. 4 in which one end of fence 164 is aligned with the rail stall divider between stalls 150.5 and 150.6 and the other end of fence 164 is aligned with the stall rail divider between stalls 150.19 and 150.20, the travel of barrier 162 is limited to between stalls 150.6 and 150.19. Thus the cows from pen 12 that go to parlor 20 to be milked, go through gate 156 and can only be milked in stalls between gate 156 and barrier 162 and the cows from pen 14 that go to parlor 20 to be milked go through gate 158 and can only be milked in stalls between gate 158 and barrier 162.

After the person in pit 136 has applied the milkers to the teats of the cows in stalls 150, all of the cows having milkers on them are simultaneously milked, and milking continues until the milkers are released automatically from the teats in the conventional manner. In the situation illustrated in FIG. 4, barrier 162 is between stalls 150.9 and 150.10, so the cows going through gate 156 can occupy any of stalls 150.1-150.9 that are empty and the cows going through gate 158 can occupy any of stalls 150.10-150.24 that are empty. As described infra, the cows typically enter alley 160 in a queue, tail to head and the first cow in the queue goes into the stall next to barrier 168, and the next cow goes into the stall next to the stall occupied by the first cow, etc.

After the cows in the occupied stalls 150 between barrier 162 and gate 156 have been milked, the exit gates of the occupied stalls 150.1-150.9 are opened either manually or automatically, and the milked cows go from stalls 150.1-150.9 into return alley 58 of pen 12; such cows are prevented from going into the return alley of pen 14 by segment 170 of barrier 162 and fence 164. After the cows in the occupied stalls 150.10-150.24 between barrier 162 and gate 158 have been milked, the exit gates of the occupied stalls 150.10-150.24 are opened either manually or automatically, and the milked cows go into return alley 58 of pen 14; such cows are prevented from going into the return alley of pen 12 by segment 170 of barrier 162 and fence 164

From the foregoing, fence portion 142.1 and fence 164 can be considered as in or part of a stationary barrier portion of barrier arrangement 30 of parlor 20, which stationary barrier portion can also be considered as including fixed fences 138, 142, 144, 159 and 161. Slidable barrier (i.e., obstruction) 164 can be considered as a movable portion of barrier arrangement 30, and the space between fences 159 and 162 can be considered as a first exit of parlor 20 and the space between fences 161 and 162 can be considered as a second exit of the parlor.

Gates 156 and 158 are closed while parlor 20 is cleaned and while barrier 162 is being moved, to prevent entry of cows into corridor 160 at these times. Gates 156 and 158 are preferably closed while all of the stalls 150 between the particular gate and barrier 162 are occupied. Alternatively, gate 156 can be open while gate 158 is closed and vice versa, causing the cows to enter corridor 160 in a queue, which usually results in the stalls 150 being occupied one by one without a break.

Figure 5:
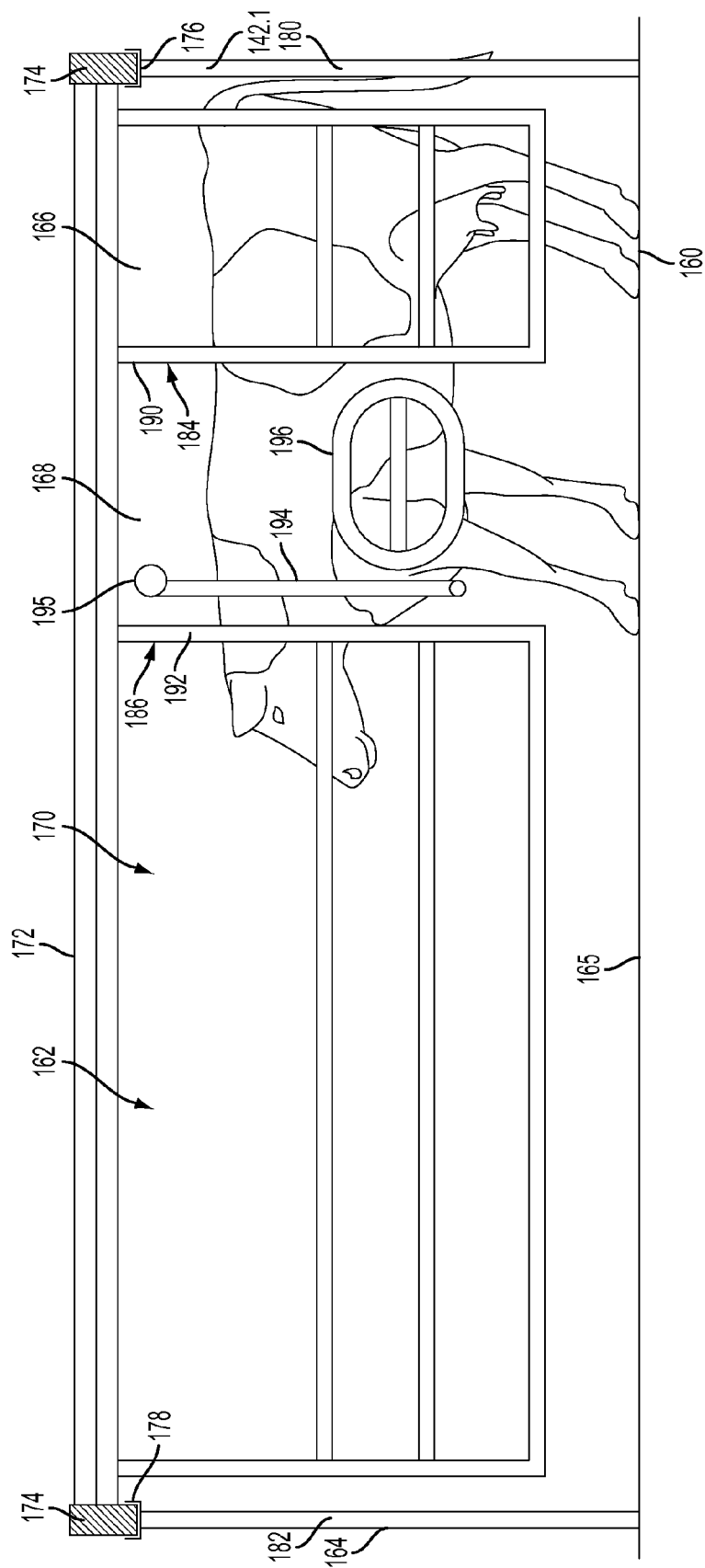
FIG. 5 is a side view of a portion of the parlor of FIG. 4.

As illustrated in FIG. 5, a side view of barrier 162 in combination with some features of parlor 20, barrier 162 includes top tube 172 that extends between fence portion 142.1 and fence 164. Opposite ends of an axle (not shown) that extends through the interior of tube 172 carry wheels 174 which ride on straight, elevated tracks 176 and 178 that run parallel to the lengths of corridor 160 and are fixedly mounted on posts 180 and 182 of fences 142.1 and 164, respectively. Barrier 162 is slid from the entrance and exit of one stall 150 to the entrance and exit of another stall 150 by a person or a machine observing a substantial change in the relative cow flow rate to parlor 20 from pens 12 and 14. In response to such an observation, the person or machine easily slides barrier 162 on elevated tracks 176 and 178. Tracks 176 and 178 include stops (not shown) that are aligned with the ends of fence 164 to prevent movement of barrier 162 beyond points aligned with the ends of fence 164, so cows from pen 12 cannot go to pen 14 and cows from pen 14 cannot go to pen 12.

Tube 172 carries substantially planar frames 184 and 186 that are (1) fixedly mounted on tube 172, (2) formed from tubes and (3) respectively form segments 166 and 170 of barrier 162. Segment 168 of barrier 162 is the portion of tube 172 above the space between vertical tubes 190 and 192 of frames 184 and 186. To maintain the integrity of the groups of cows assigned to pens 12 and 14, barrier 162 cannot be moved past a stall 150 that is occupied by a cow; otherwise, a cow that originally came from pen 12 would, after milking, go to pen 14 or a cow that originally came from pen 14 would, after milking, go to pen 12. To provide maximum use of stalls 150, barrier 162 is slid so frames 184 and 186 come to rest in the same plane as the plane of a stall divider between two stalls 150 that are next to each other. Such sliding can be done (1) automatically by controller 88 responding to an indication of the relative positons of the barrier and the stalls 150 to drive a motor arrangement (not shown) for wheels 174, which motor arrangement is on the barrier, and/or (2) in cooperation with a detent arrangement (not shown) carried by one of frames 184 or 186 and a stationary latch on one of tracks 176 or 178 or the dividers between neighboring pairs of stalls 150. Barrier 162 can also be easily slid manually by (1) a person using its eyes to line up frames 184 and 186 with a stall divider or (2) a person relying on a detent arrangement and latch arrangement which causes frames 184 and 186 to line up with a stall divider.

Each of stalls 150 includes a typical prior art looped retaining fence 194 that pivots upwardly about horizontal rod 195 and a conventional flipper gate 196. As a row of cows enters parlor 20 in a queue, head to tail, the first cow in the queue walks to sliding barrier segment 166, then turns ninety degrees through loops included in fence 194. Gate 196 causes the next cow in the row to turn ninety degrees into the next stall, that is, the stall next to the stall where barrier 162 is located. This action is repeated until all the stalls between barrier 162 and stall 150.1 are filled. Fence 194 pivots about rod 195 in a first direction to push the cows back toward pit 136 so utters of the cows are accessible to the person in pit 136 doing the milking. After milking has been completed, fence 194 pivots about rod 195 in the opposite direction to urge the cow into corridor 160. Oval shaped, spring loaded gate 196, which is positioned closer to the stall entrance than fence 194, prevents the cows from prematurely turning into fence 196. When a cow goes to the portion of corridor 160 where the next available stall is located, her body presses against gate 196 to open the path for the next cow in the queue, causing the next cow to put her head through the loop fence in the next stall in corridor 160 to be entered. Thus, fence 194 and gate 196 make the cows line up side by side in sequential stalls 150 off corridor 160, as illustrated in FIG. 4. Because fence 194 and gate 196 are well known prior art structures, details thereof are not shown or discussed.

Parlor 20 of FIG. 6 includes substantially identical segments 197 and 198 that are separated from each other by straight fence 199 that extends from fence 40 that defines boundaries of pens 12 and 16 to fence 40 that defines boundaries of pens 14 and 18, such that parlor segment 197 only processes cows from pens 12 and 14, while segment 198 only processes cows from pens 16 and 18; consequentially only segment 197 is described. Parlor 20 of FIG. 6 differs structurally somewhat from the parlor of FIG. 4 because, for example, the parlor of FIG. 6 does not have a pit and includes a straight row of robotic milking stalls 200.1 . . . 200.4, 200.5 . . . 200.10 instead of manual milking stalls 150. A robotic milker 210 is mounted on one wall of each of stalls 200. Despite the structural differences of FIGS. 4 and 6, the barrier arrangements 30 of FIGS. 4 and 6 are functionally substantially the same because, in both, the cows from pens 12, 14, 16 and 18 can be simultaneously milked and the integrity of the groups of cows from the pens is maintained; the barriers are structurally somewhat similar.

Because each of stalls 200.2 . . . 200.9 is substantially the same, only stall 200.2 is discussed. Stalls 200.1 and 200.10 at opposite ends of the row of stalls 200 are generally discussed after stalls 200.2 . . . 200.9.

One exterior wall 201 of stall 200.2, which is opposite the wall carrying milker 210, includes entrance 202, exit 204, entrance gate 206 and exit gate 208. Gates 206 and 208 are shown in the open positions thereof, tilted relative to the length of stall 200.2. Gates 206 and 208 swing about a post in the center of exterior wall 201 of stall 200.2 from a closed position in which the gates abut the center post, to the illustrated open position in which the gates swing to about 30 degrees from the center post. Gate 206 is open and gate 208 is closed when stall 200.2 is unoccupied. In response to a controller (not shown) for the milking stalls 200 sensing that a cow has entered stall 200.2, both gates 206 and 208 are closed and remain closed until the cow has been processed, at which time the controller opens gate 208 and leaves gate 206 closed. The controller leaves gates 206 and 208 in this position for a predetermined time after it senses that the cow has left stall 200.2, at which time the controller closes gate 208 and opens gate 206 of stall 200.2. The arrangement of entrance 202, exit 204 and gates 206 and 208 directs cows into the entrance 202 of stall 200.2 and out of that stall through exit 204 upon release of each cow from the robotic milker 210 of the particular stall, at the completion of milking.

Gates 206 associated with stalls 200.1 and 200.10 differ from gates 206 of stalls 200.2 . . . 200.9 because, when the gates associated with stalls 200.1 and 200.10 are open, the ends of these gates remote from the center posts associated with stalls 200.1 and 200.10 respectively abut fixed fences 212 and 214. Gates 208 associated with stalls 200.1 and 200.10 differ from gates 208 of stalls 200.2 . . . 200.9 because, when the gates associated with stalls 200.1 and 200.10 are open, the ends remote from the center posts of the gates associated with stalls 200.1 and 200.10 respectively abut fences 212 and 214. Thereby, cows milked in any of stalls 200 cannot wander into alleys of pens 12 and 14 that are occupied by cows going toward parlor 20 when both gates 206 and 208 associated with stall 200.1 and/or 200.10 are closed. In addition, cows milked in stall 200.1 and/or stall 200.10 that have gone through the open gate 208 of stall 200.1 cannot wander into alleys of pen 12 occupied by cows going toward parlor 20, and cows milked in stall 200.10 that have gone through open gate 208 of stall 200.10 cannot wander into alleys of pen 14 occupied by cows going toward parlor 20.

Fixed fences 212 and 214 of barrier arrangement 30 of parlor 20 respectively extend (1) from posts (not shown) at the ends of open gates 208 of stalls 200.1 and 200.10, which posts are remote from the sides of stalls 200.1 and 200.10 and parts of fences 212 and 214, (2) to the sides of return alleys 58 of pens 12 and 14, which sides are opposite fence 44 that separates the return alleys of pens 12 and 14. The center of the row in which stalls 200 are located is aligned with fence 44 so that in the structure illustrated in FIG. 6 the space halfway between stalls 200.5 and 200.6 is aligned with fence 44. The foregoing arrangement of fences 199, 212 and 214 causes the cows leaving pens 12 and 14 to enter corridor 216 between stalls 200 and fence 199, thence to selected unoccupied stalls 200, and assures that the cows in corridor 216 enter return alleys 58 of pens 12 and/or 14 after being milked.

Barrier arrangement 30 also includes fixed, straight fence 218 that extends parallel to fixed straight fence 199, as well as corridor 216. The center of fence 218 is aligned with fence 44 as well as the center of the row of stalls 200. Barrier arrangement 30 also includes substantially planar slidable barrier (obstruction) 220 that extends from fence 199 to fence 218 and is slidable in a direction at right angles to the row of stalls 200. Cows on one side of barrier 220, in the direction of movement of the barrier, cannot go through the barrier to the other side of barrier 220. While there is a small gap between barrier 220 and fences 199 and 218 so the fences do not interfere with movement of the barrier, the gap is small enough to prevent cows from going through it. The foregoing arrangement of fences 212 and 214 as well as barrier 220 causes the milked cows leaving stalls 200 via exits 204 to enter corridor 222 between stalls 200 and fences 212 and 214, thence to the return alley 58 of either pen 12 or 14, depending on the position of barrier 220; alleys 58 of pens 12 and 14 can be considered to be first and second return alleys of the facility.

To assist in maintaining the integrity of the groups of cows assigned to pens 12 and 14, fixed fences 227 are included. Fences 227 lie along a line that is (1) equidistant from pairs of stalls 200 that are next to each other, and (2) perpendicular to fence 218, to prevent cows in corridor 222 from returning to corridor 216 while both gates 206 and 208 of a particular stall 200 are simultaneously closed. Fences 227 are very short, extending only from a point aligned with a point that is about in the middle of a closed entrance gate 206 to a point aligned with the edges of stalls 200 that define the side of corridor 222 opposite from fence 218. Thereby fences 227 do not interfere with the operation of barrier 224. The integrity of the groups of cows assigned to pens 12 and 14, is also maintained because barrier 220 cannot be moved past a stall 200 that is occupied by a cow; otherwise a cow that originally came from pen 12 would go, after milking, to pen 14 or a cow from pen 14 would go after milking, to pen 12.

The length of fence 218 determines the maximum extent of movement of barrier 220 such that barrier 220 cannot be moved past the ends of fence 218. Otherwise, a cow that originally came from pen 12 could go, after milking, to pen 14 or vice versa. In the facility illustrated in FIG. 6, in which one end of fence 218 is halfway between stalls 220.2 and 200.3 and the other end of fence 218 is halfway between stalls 200.8 and 200.9, barrier 220 can only be moved from halfway between stalls 200.3 and 200.4 to halfway between stalls 200.8 and 200.9. For maximum efficiency, barrier 220 is positioned halfway between stalls 200 that are next to each other; in FIG. 6, barrier 220 is halfway between stalls 200.4 and 200.5. Such positioning can be accomplished by a person using its eyes or a detent mechanism (not shown) can be used in combination with manual or automatic driving of the barrier.

Figure 7:
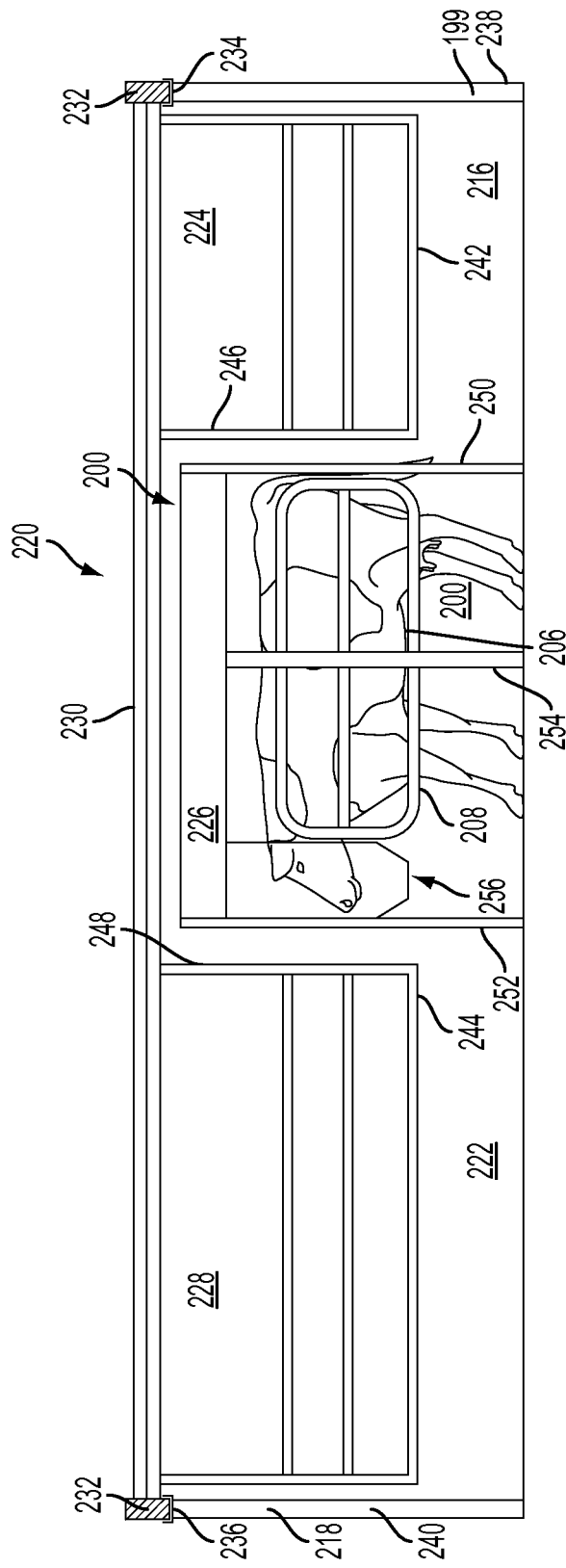
FIG. 7 is a side view of a portion of the parlor of FIG. 6.

Barrier 220 includes three aligned substantially planar segments 224, 226 and 228, such that segments 224 and 228 are respectively in corridors 216 and 220, and segment 226 is above stalls 200, as illustrated in FIG. 7 which includes a side view of barrier 220 in combination with some features of parlor 20. Barrier 220 includes top tube 230 that extends between fences 199 and 218. Opposite ends of an axle (not shown) that extends through the interior of tube 230 carry wheels 232 which ride on tracks 234 and 236 that are fixedly mounted on posts 238 and 240 of fences 199 and 218, respectively.

Tube 230 carries substantially planar frames 242 and 244 that are (1) fixedly mounted on tube 230, (2) formed from tubes and (3) respectively form segments 224 and 228 of barrier 220. Segment 226 of barrier 220 is the portion of tube 230 above the space between vertical tubes 246 and 248 of frames 244 and 248, respectively. To maintain the integrity of the groups of cows assigned to pens 12 and 14, barrier 220 cannot be moved past a stall 220 that is occupied by a cow; otherwise, a cow that originally came from pen 12 would return to pen 14 or a cow that originally came from pen 14 would return to pen 12. To provide maximum use of stalls 200, barrier 220 is slid so frames 242 and 244 come to rest in the same plane as the plane halfway between two stalls 200 that are next to each other. Such sliding can be done automatically by controller 88 responding to an indication of the relative positons of barrier 220 and stalls 200 to drive a motor arrangement (not shown) for wheels 232, which motor arrangement is on the barrier, and/or in cooperation with a detent arrangement (not shown) carried by one of frames 242 or 244 and a stationary latch on one of tracks 234 or 236. Barrier 220 can also be easily slid manually by a person using its eyes to line up frames 242 and 244 with the intersection of open gates 206 and 208 halfway between a pair of stalls 200 that are next to each other or by using the detent and latch arrangement.

Robotic milking stall 200 includes posts 250 and 252 that are between posts 246 and 248 and are spaced from each other by an amount slightly in excess of the length of the longest cows expected to be milked in the facility. Stall 200 also includes (1) central posts 254 (only one of which is illustrated) that carry gates 206 and 208, (2) feed bowl 256 that is mounted on post 252, and (3) a robotic milker (not shown in FIG. 7).

While various embodiments of the invention have been illustrated and described, it will be clear that the invention is not limited to these embodiments. Numerous other modifications, changes, variations, substitutions and equivalents will be apparent to those skilled in the art without departing from the spirit and scope of the invention as described in the claims. For example, the facility can be expanded to have more than four pens with or without a central parlor. In addition, the use of a moving barrier which carries cleaning and refurbishing materials for bedding stalls that have no cows in them due to the action and dimensions of the moving barrier and other factors can be included in a facility having only one pen. Also, if it is expected that the relative flow rates of the cows entering parlor 20 from the various pens will be relatively constant for a substantial time, aligned non-slidable barriers, similar to frames 184 and 186, can be mounted in corridors 160 and 165, e.g., in the centers of the corridors, or aligned non-slidable barriers, similar to segments 224 and 228, can be mounted in corridors 216 and 222.

I claim:

1. A facility for handling lactating animals comprising a free stall barn having first and second pens, each including: (a) a set of bedding free stalls, and (b) an alley accessible by the animals as they enter and leave the free stalls; a milking parlor including plural milking stalls each including an entrance and an exit; and paths in the facility for the animals, the paths being arranged for (a) causing animals assigned to and located in the first pen, prior to milking, to return to the first pen after being milked, (b) causing animals assigned to and located in the second pen, prior to milking, to return to the second pen after being milked, and (c) enabling animals assigned to the first and second pens to be simultaneously milked in different milking stalls of the parlor; the paths including: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen; the first return alley and a barrier arrangement of the milking parlor being arranged so that the animals assigned to the second pen cannot enter the first return alley, (d) a second return alley extending from the second exit in the parlor to a portion of the accessible alley of the second pen; the second return alley and the barrier arrangement of the milking parlor being arranged so that the animals assigned to the first pen cannot enter the second return alley; the barrier arrangement of the parlor being arranged for causing (i) animals entering the parlor via the first parlor entrance to be guided only to the entrances of milking stalls having exits that are accessible to the first return alley, and (ii) animals entering the parlor via the second parlor entrance to be guided only to the entrances of milking stalls having exits that are accessible to the second return alley; the barrier arrangement of the parlor including a movable segment; the movable segment of the parlor barrier arrangement including a slidable obstruction arrangement that is slidable past the entrances and exits of the milking stalls so that during different times the slidable obstruction arrangement position can cause the animals from the first and second pens to enter and leave differing numbers of the milking stalls.

2. The facility of claim 1 wherein the slidable obstruction arrangement is substantially planar, extends in the same direction as the length of the milking stalls, and has portions extending beyond the entrances and exits of the milking stalls, and the parlor barrier arrangement includes first and second stationary obstructions that are adjacent to ends of the slidable obstruction arrangement remote from the entrances and exits of the milking stalls, the spacing between the ends of the slidable obstruction arrangement and the stationary obstructions being such that the animals cannot get between the ends of the slidable obstruction arrangement and the stationary obstructions.

3. The facility of claim 2 wherein (a) the parlor barrier arrangement includes first and second stationary obstructions that are adjacent to ends of the slidable obstruction arrangement remote from the entrances and exits of the milking stalls, the spacing between the ends of the slidable obstruction arrangement and the stationary obstructions being such that the animals cannot get between the ends of the slidable obstruction arrangement, and (b) the first and second stationary obstructions extend perpendicular to the portions of the of the substantially planar arrangement that extend beyond the entrances and exits of the milking stalls.

4. A method of handling lactating animals using the facility of claim 1 comprising: sliding the slidable obstruction arrangement so that at different times the position of the slidable obstruction arrangement enables the animals from the first and second pens to enter and leave differing numbers of the milking stalls.

5. The method of claim 4 comprising the step of causing the movement of the barriers in each of the pens to be staggered, so the barriers of the pens approach the parlor at different times to provide a more even flow of cows to be milked from the pens into the parlor.

6. The facility of claim 1 wherein the free stall barn further includes third and fourth pens, each including: (a) a set of bedding free stalls, and (b) an alley accessible by the animals as they enter and leave the free stalls ; the paths being arranged for (a) causing animals assigned to and located in the third pen, prior to milking, to return to the third pen after being milked while preventing the animals assigned to and located in the first, second and fourth pens, prior to milking, to enter the third pen after being milked, (b) causing animals assigned to and located in the fourth pen, prior to milking, to return to the fourth pen after being milked while preventing the animals assigned to and located in the first, second and third pens, prior to milking, to enter the fourth pen after being milked, and (c) enabling animals assigned to the first, second, third and fourth pens to be simultaneously milked in different milking stalls of the parlor; the paths including: (a) third and fourth entrances in the parlor for animals respectively assigned to the third and fourth pens, (b) third and fourth exits in the parlor for animals respectively assigned to the third and fourth pens, (c) a third return alley extending from the third exit in the parlor to a portion of the accessible alley of the third pen, the third return alley and the barrier arrangement of the milking parlor being arranged so that the animals assigned to the first, second and fourth pens cannot enter the third return alley; (d) a fourth return alley extending from the fourth exit in the parlor to a portion of the accessible alley of the fourth pen, the barrier arrangement of the milking parlor being arranged so that the animals assigned to the first, second and third pens cannot enter the fourth return alley; the barrier arrangement of the parlor being arranged for causing (i) animals entering the parlor via the third parlor entrance to be guided only to the entrances of milking stalls having exits that are accessible to the third return alley, and (ii) animals entering the parlor via the fourth parlor entrance to be guided only to the entrances of milking stalls having exits that are accessible to the fourth return alley; the barrier arrangement of the parlor including another movable segment; the another movable segment of the parlor barrier arrangement including another slidable obstruction arrangement that is slidable past the entrances and exits of the milking stalls for animals assigned to the third and fourth pens so that during different times the another slidable obstruction arrangement position can cause the animals from the third and fourth pens to enter and leave differing numbers of the milking stalls.

7. The facility of claim 6 wherein the first and second pens, and the first and second return alleys are on a first side of the parlor, and the third and fourth pens and the third and fourth return alleys are on a second side of the parlor.

8. The facility of claim 6 wherein the first and second sides extend parallel to each other.

9. The facility of claim 6 wherein the obstruction arrangement of the parlor includes a stationary obstacle between the milking stalls for the animals assigned to the first and second pens and the milking stalls for the animals assigned to the third and fourth pens.

10. The facility of claim 1 wherein (a) each of the pens includes a movable barrier for traversing the accessible alley of its respective pen; (b) said portion of the accessible alley of the first pen is behind the movable barrier of the accessible alley of the first pen, (c) said portion of the accessible alley of the second pen is behind the movable barrier of the accessible alley of the second pen; (d) the first return alley, the accessible alley of the first pen and the movable barrier of the first pen are arranged so the animals assigned to the first pen are, prior to milking, in front of the movable barrier of the first pen and after milking are behind the movable barrier of the first pen; (e) the second return alley, the accessible alley of the second pen and the movable barrier of the second pen are arranged so the animals assigned to the second pen are, prior to milking, in front of the movable barrier of the second pen and after milking are behind the movable barrier of the second pen.

11. A method of handling lactating animals using the facility of claim 10, which method includes causing (a) the movable barrier of the first pen to traverse the accessible alley of the first pen so the traversal of the accessible alley of the first pen starts just in front of said portion of the accessible alley of the first pen, (b) the movable barrier of the first pen to return to its start position upon completion of its traversal of the accessible alley of the first pen without interfering with the animals in the accessible alley of the first pen, and (c) the movable barrier of the second pen to traverse the accessible alley of the second pen so the traversal of the accessible alley of the second pen starts just in front of said portion of the accessible alley of the second pen, and (d) the movable barrier of the second pen to return to its start position upon completion of its traversal of the accessible alley of the second pen without interfering with the animals in the accessible alley of the second pen.

12. The method of claim 11 further including causing the movable barriers of the first and second pens to respectively periodically traverse the accessible alleys of the first and second pens.

13. The method of claim 11 further comprising sliding the slidable obstruction arrangement so that at different times the position of the slidable obstruction arrangement enables the animals from the first and second pens to enter and leave differing numbers of the milking stalls.

14. The method of claim 11 comprising the step of causing the movement of the barriers in each of the pens to be staggered, so the barriers of the pens approach the parlor at different times to provide a more even flow of cows to be milked from the pens into the parlor.

15. The facility of claim 1 wherein the free stall barn further includes first and second sort pens, each including bedding free stalls; a first sort gate arrangement having a first position wherein an animal in the first return alley can enter the first sort pen and is prevented from entering the accessible alley of the first pen and a second position wherein an animal in the return alley can enter the portion of the accessible alley of the first pen and is prevented from entering the first sort pen; a second sort gate arrangement having a first position wherein an animal in the second return alley can enter the second sort pen and is prevented from entering the accessible alley of the second pen and a second position wherein an animal in the return alley can enter the portion of the accessible alley of the second pen and is prevented from entering the second sort pen; another gate arrangement for controlling movement of animals from the first sort pen to the accessible alley of the first pen; a further gate arrangement for controlling movement of animals from the second sort pen to the accessible alley of the second pen.

16. The facility of claim 1 wherein the milking stalls are in a straight row, the barrier arrangement of the parlor includes: (a) a first fixed straight barrier that is parallel to the row to form a first corridor for animals going to the entrances of the milking stalls, (b) a second fixed straight barrier that is parallel to the row to form a second corridor for animals leaving the exits of the milking stalls; the slidable obstruction arrangement being: (a) substantially planar, (b) extending at right angles to the corridors and the row, (c) slidable in the direction of the length of the row, and including structures adapted to ride in the corridors for preventing animals in the corridors from moving between the sides of the slidable barrier arrangement, the length of the second fixed barrier being less than the length of the row by a distance equal to the widths of at least two of the milking stalls; the paths being arranged so that (a) the animals in the second corridor and on a first side of the slidable obstruction arrangement can reach the first return alley only by going from the second corridor to the first return alley around a first end of the second fixed barrier, and (b) the animals in the second corridor and on a second side of the slidable obstruction arrangement can reach the second return alley only by going from the second corridor to the second return alley around a second end of the second fixed barrier.

17. A method of using the facility of claim 16 comprising limiting the movement of the slidable obstruction arrangement so the slidable obstruction arrangement does go beyond milking stalls aligned with the first and second ends of the second fixed barrier.

18. The method of claim 17 comprising the step of resting the slidable obstruction arrangement only in alignment with a space between a pair of the milking stalls which are next to each other.

19. A facility for handling lactating animals comprising a free stall barn having first and second pens, each including: (a) a set of bedding free stalls, (b) an alley accessible by the animals as they enter and leave the free stalls and (c) a movable barrier for traversing the accessible alley of its respective pen; a milking parlor including plural milking stalls each including an entrance and an exit; and paths in the facility for the animals, the paths being arranged for (a) causing animals assigned to and located in the first pen, prior to milking, to return to the first pen after being milked while preventing the animals assigned to and located in the second pen, prior to milking, to enter the first pen after being milked, (b) causing animals assigned to and located in the second pen, prior to milking, to return to the second pen after being milked while preventing the animals assigned to and located in the first pen, prior to milking, to enter the second pen after being milked, and (c) enabling animals assigned to the first and second pens to be simultaneously milked in different milking stalls of the parlor; the paths including: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen, which portion of the accessible alley of the first pen is behind the movable barrier of the accessible alley of the first pen, the first return alley and a barrier arrangement of the milking parlor being arranged so that animals assigned to the second pen cannot enter the first return alley; the first return alley, the accessible alley of the first pen and the movable barrier of the first pen being arranged so the animals assigned to the first pen are, prior to milking, in front of the movable barrier of the first pen and after milking are behind the movable barrier of the first pen, (d) a second return alley extending from the second exit in the parlor to a portion of the accessible alley of the second pen, which portion of the accessible alley of the second pen is behind the movable barrier of the accessible alley of the second pen, the second return alley and the barrier arrangement of the milking parlor being arranged so that the animals assigned to the first pen cannot enter the second return alley, the second return alley, the accessible alley of the second pen and the movable barrier of the second pen being arranged so animals assigned to the second pen are, prior to milking, in front of the movable barrier of the second pen and after milking are behind the movable barrier of the second pen; the barrier arrangement of the parlor being arranged for causing (i) animals entering the parlor via the first parlor entrance to be guided only to the entrances of milking stalls having exits that are accessible to the first return alley, and (ii) animals entering the parlor via the second parlor entrance to be guided only to the entrances of milking stalls having exits that are accessible to the second return alley.

20. The facility of claim 19 wherein the movable barrier of the first pen is arranged to traverse the accessible alley of the first pen so the traversal of the accessible alley of the first pen starts just in front of said portion of the accessible alley of the first pen, and the movable barrier of the first pen is arranged to return to its start position upon completion of its traversal of the accessible alley of the first pen without interfering with the animals in the accessible alley of the first pen, and the movable barrier of the second pen is arranged to traverse the accessible alley of the second pen so the traversal of the accessible alley of the second pen starts just in front of said portion of the accessible alley of the second pen, and the movable barrier of the second pen is arranged to return to its start position upon completion of its traversal of the accessible alley of the second pen without interfering with the animals in the accessible alley of the second pen.

21. The facility of claim 19 further including a controller for causing the movable barriers of the first and second pens to periodically traverse the accessible alleys of the first and second pens, respectively.

22. The facility of claim 19 wherein the barrier arrangement of the parlor includes a movable segment arranged so that at different times the animals from the first and second pens can enter and leave differing numbers of the milking stalls.

23. The facility of claim 22 wherein the movable segment of the parlor barrier arrangement includes a slidable portion that is slidable past the entrances and the exits of the milking stalls so that at different times the slidable portion position enables the animals from the first and second pens to enter and leave differing numbers of the milking stalls.

24. The facility of claim 19 wherein the movable barriers of the first and second pens include refurbishing devices for the bedding free stalls of the first and second pens, respectively.

25. The facility of claim 24 wherein the refurbishing devices include bedding cleaners and bedding suppliers.

26. The facility of claim 19 wherein the free stall barn further includes third and fourth pens, each including: (a) a set of bedding free stalls, (b) an alley accessible by the animals as they enter and leave the free stalls and (c) a movable barrier for traversing the alley of its respective pen; the paths being arranged for (a) causing animals assigned to and located in the third pen, prior to milking, to return to the third pen after being milked while preventing the animals assigned to and located in the first, second and fourth pens, prior to milking, to enter the third pen after being milked, (b) causing animals assigned to and located in the fourth pen, prior to milking, to return to the fourth pen after being milked while preventing the animals assigned to and located in the first, second and third pens, prior to milking, to enter the fourth pen after being milked, and (c) enabling animals assigned to the first, second, third and fourth pens to be simultaneously milked in different milking stalls of the parlor; the paths including: (a) third and fourth entrances in the parlor for animals respectively assigned to the third and fourth pens, (b) third and fourth exits in the parlor for animals respectively assigned to the third and fourth pens, (c) a third return alley extending from the third exit in the parlor to a portion of the accessible alley of the third pen, which portion of the accessible alley of the third pen is behind the movable barrier of the accessible alley of the third pen, the third return alley and the barrier arrangement of the milking parlor being arranged so that the animals assigned to the first, second and fourth pens cannot enter the third return alley; the third return alley, the accessible alley of the third pen and the movable barrier of the third pen being arranged so animals assigned to the third pen are, prior to milking, in front of the movable barrier of the third pen and after milking are behind the movable barrier of the third pen, (d) a fourth return alley extending from the fourth exit in the parlor to a portion of the accessible alley of the fourth pen, which portion of the accessible alley of the fourth pen is behind the movable barrier of the accessible alley of the fourth pen, the fourth return alley and the barrier arrangement of the milking parlor being arranged so that the animals assigned to the first, second and third pens cannot enter the fourth return alley, the fourth return alley, the accessible alley of the fourth pen and the movable barrier of the fourth pen being arranged so animals assigned to the fourth pen are, prior to milking, in front of the movable barrier of the fourth pen and after milking are behind the movable barrier of the fourth pen; the barrier arrangement of the parlor being arranged for causing (i) animals entering the parlor via the third parlor entrance to be guided only to the entrances of milking stalls having exits that are accessible to the third return alley, and (ii) animals entering the parlor via the fourth parlor entrance to be guided only to the entrances of milking stalls having exits that are accessible to the fourth return alley.

27. The facility of claim 19 wherein the free stall barn further includes first and second sort pens, each including bedding free stalls; a first sort gate arrangement having a first position wherein an animal in the first return alley can enter the first sort pen and is prevented from entering the accessible alley of the first pen and a second position wherein an animal in the return alley can enter the portion of the accessible alley of the first pen and is prevented from entering the first sort pen; a second sort gate arrangement having a first position wherein an animal in the second return alley can enter the second sort pen and is prevented from entering the accessible alley of the second pen and a second position wherein an animal in the return alley can enter the portion of the accessible alley of the second pen and is prevented from entering the second sort pen; another gate arrangement for controlling movement of animals from the first sort pen to the accessible alley of the first pen; a further gate arrangement for controlling movement of animals from the second sort pen to the accessible alley of the second pen.

28. A method of using the facility of claim 19 comprising (a) causing animals assigned to and located in the first pen, prior to milking, to return to the first pen after being milked while preventing the animals assigned to and located in the second pen, prior to milking, to enter the first pen after being milked, (b) causing animals assigned to and located in the second pen, prior to milking, to return to the second pen after being milked while preventing the animals assigned to and located in the first pen, prior to milking, to enter the second pen after being milked, and (c) causing animals assigned to the first and second pens to be simultaneously milked in different milking stalls of the parlor; (d) causing the animals assigned to the first pen to be, prior to milking, in front of the movable barrier of the first pen and, after milking, to be behind the movable barrier of the first pen, (d) causing the animals assigned to the second pen to be, prior to milking, in front of the movable barrier of the second pen and after milking to be behind the movable barrier of the second pen; and (e) arranging the barrier arrangement of the parlor so that (i) animals entering the parlor by the first parlor entrance are guided only to the entrances of milking stalls having exits that are accessible to the first return alley, and (ii) animals entering the parlor by the second parlor entrance are guided only to the entrances of milking stalls having exits that are accessible to the second return alley.

29. The method of claim 28 further including causing the movable barriers of the first and second pens to respectively periodically traverse the accessible alleys of the first and second pens.

30. The method of claim 28 wherein the barrier arrangement of the parlor includes a movable segment arranged so that at different times the animals from the first and second pens can enter and leave differing numbers of the milking stalls., the method further comprising sliding the slidable obstruction arrangement so that at different times the position of the slidable obstruction arrangement enables the animals from the first and second pens to enter and leave differing numbers of the milking stalls.

31. The method of claim 30 wherein the movable segment of the parlor barrier arrangement includes a slidable portion that is slidable past the entrances and the exits of the milking stalls, the method further comprising during a period between the first and second intervals sliding the slidable portion past the entrances and exits of at least some of the milking stalls so that during the first interval the slidable portion position enables the animals from the first and second pens to respectively enter and leave P and Q of the milking stalls and during the second interval the slidable portion position enables the animals from the first and second pens to respectively enter and leave R and S of the milking stalls.

32. The method of claim 28 comprising the step of causing the movement of the barriers in each of the pens to be staggered, so the barriers of the pens approach the parlor at different times to provide a more even flow of cows to be milked from the pens into the parlor.

33. The facility of claim 19 wherein the movable barrier of each pen, the accessible alley of each pen, the bedding free stalls of each pen and the paths are arranged for: (a) preventing animals in the bedding free stalls of each pen and in the alley segment behind the barrier of each pen from going in front of the movable barrier of each pen; and (b) preventing the animals to be in bedding free stalls of each pen that are next to the moving barrier of each pen; the moving barrier of each pen including bedding refurbishing devices for refurbishing bedding in the bedding free stalls of each pen next to the barrier of the respective pen as the movable barrier of the respective pen traverses the accessible alley of the respective pen.

34. A facility for handling lactating animals comprising a milking parlor, a free stall barn having a pen including: (a) a set of bedding free stalls, and (b) an alley accessible by the animals as the animals enter and leave the free stalls; the alley including a barrier that is movable longitudinally in the alley past the stalls; paths in the facility for enabling animals leaving the alley to go to the parlor and from the parlor back to a portion of the alley that is behind the barrier; the paths being arranged for enabling animals located in the alley and stalls in front of the barrier, prior to milking, to return, after milking, to the portion of the alley behind the barrier; the barrier, alley, stalls and paths being arranged for: (a) causing animals in stalls and in the alley segment in front of the barrier to move toward the milking parlor, (b) preventing animals in stalls and in the alley segment behind the barrier from going in front of the barrier; and (c) preventing the animals to be in stalls that are next to the moving barrier; the barrier including bedding refurbishing devices for refurbishing bedding in the stalls next to the barrier as the barrier traverses the alley.

35. The facility of claim 34 wherein the facility includes a plurality of said pens, each of said pens including a portion of a of a path between the respective pen and the parlor, each of the paths being arranged for enabling animals leaving the alley of the respective pen to go to the parlor and from the parlor back to a portion of the alley that is behind the barrier of the respective pen; the paths being arranged for enabling animals located in the alley and stalls of the respective pen in front of the barrier of the respective pen, prior to milking, to return, after milking, to the portion of the alley of the respective pen behind the barrier of the respective pen; the barrier, alley and stalls of the respective pen and. the paths being arranged for: (a) causing animals in stalls of the respective pen and in the alley segment of the respective pen in front of the barrier of the respective pen to move toward the milking parlor, (b) preventing animals in stalls of the respective pen and in the alley segment of the respective pen behind the barrier of the respective pen from going in front of the barrier of the respective pen; and (c) preventing the animals to be in stalls of the respective pen that are next to the moving barrier of the respective pen; the barrier of the respective pen including bedding refurbishing devices for refurbishing bedding in the stalls of the respective pen next to the barrier of the respective pen as the barrier of the respective pen traverses the alley of the respective pen.

36. A facility for handling lactating animals comprising a free stall barn having first and second pens, each including: (a) a set of bedding free stalls, and (b) an alley accessible by the animals as they enter and leave the free stalls; a milking parlor including plural milking stalls each including an entrance and an exit; and paths in the facility for the animals, the paths being arranged for (a) causing animals assigned to and located in the first pen, prior to milking, to return to the first pen after being milked, (b) causing animals assigned to and located in the second pen, prior to milking, to return to the second pen after being milked, and (c) enabling animals assigned to the first and second pens to be simultaneously milked in different milking stalls of the parlor; the paths including: (a) first and second entrances in the parlor for animals respectively assigned to the first and second pens, (b) first and second exits in the parlor for animals respectively assigned to the first and second pens, (c) a first return alley extending from the first exit in the parlor to a portion of the accessible alley of the first pen; the first return alley and a barrier arrangement of the milking parlor being arranged so that the animals assigned to the second pen cannot enter the first return alley, (d) a second return alley extending from the second exit in the parlor to a portion of the accessible alley of the second pen; the second return alley and the barrier arrangement of the milking parlor being arranged so that the animals assigned to the first pen cannot enter the second return alley; the barrier arrangement of the parlor being arranged for causing (i) animals entering the parlor via the first parlor entrance to be guided only to the entrances of milking stalls having exits that are accessible to the first return alley, and (ii) animals entering the parlor via the second parlor entrance to be guided only to the entrances of milking stalls having exits that are accessible to the second return alley; the barrier arrangement of the parlor including an obstruction arrangement; the milking stalls being in a straight row, the barrier arrangement of the parlor includes: (a) a first fixed straight barrier that is parallel to the row to form a first corridor for animals going to the entrances of the milking stalls, (b) a second fixed straight barrier that is parallel to the row to form a second corridor for animals leaving the exits of the milking stalls; the obstruction arrangement being: (a) substantially planar, (b) extending at right angles to the corridors and the row, (c) and including structures in the corridors for preventing animals in the corridors from moving between the sides of the barrier arrangement, the length of the second fixed barrier being less than the length of the row by a distance equal to the widths of at least two of the milking stalls; the paths being arranged so that (a) the animals in the second corridor and on a first side of the obstruction arrangement can reach the first return alley only by going from the second corridor to the first return alley around a first end of the second fixed barrier, and (b) the animals in the second corridor and on a second side of the obstruction arrangement can reach the second return alley only by going from the second corridor to the second return alley around a second end of the second fixed barrier.

37. The facility of claim 36 wherein the obstruction arrangement is in alignment with a space between a pair of the milking stalls which are next to each other.

* * * * *